US010798664B2

(12) United States Patent
Lee et al.

(10) Patent No.: US 10,798,664 B2
(45) Date of Patent: Oct. 6, 2020

(54) METHOD AND APPARATUS FOR REPORTING POWER HEADROOM IN WIRELESS COMMUNICATION SYSTEM

(71) Applicant: LG Electronics Inc., Seoul (KR)

(72) Inventors: Hyunho Lee, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/525,848

(22) Filed: Jul. 30, 2019

(65) Prior Publication Data

US 2019/0357156 A1  Nov. 21, 2019

Related U.S. Application Data

(63) Continuation of application No. 16/065,763, filed as application No. PCT/KR2018/005167 on May 4, 2018.

(Continued)

(51) Int. Cl.
*H04W 52/36* (2009.01)
*H04L 1/00* (2006.01)
(Continued)

(52) U.S. Cl.
CPC ......... *H04W 52/365* (2013.01); *H04L 1/0003* (2013.01); *H04L 1/1819* (2013.01);
(Continued)

(58) Field of Classification Search
None
See application file for complete search history.

(56) References Cited

U.S. PATENT DOCUMENTS 8,982,801 B2  3/2015  Shin et al.
2012/0294167 A1*  11/2012  Zhu ................... H04W 52/146
370/252

(Continued)

FOREIGN PATENT DOCUMENTS

KR  20140123846  10/2014
KR  20150016473  2/2015

OTHER PUBLICATIONS

ITRI, "Discussion on PHR for sTTI operation", R1-1705536, 3GPP TSG RAN WG1 Meeting #88bis, Spokane, USA, Mar. 24, 2017.

(Continued)

*Primary Examiner* — Bunjob Jaroenchonwanit
(74) *Attorney, Agent, or Firm* — Fish & Richardson P.C.

(57) ABSTRACT

A method of power headroom (PH) report for a user equipment (UE) for supporting a short transmission time interval (TTI) length in a wireless communication system is performed by the UE and includes upon triggering the PH report, calculating a PH value for a first carrier wave or cell configured with the short TTI length configured for the UE and a PH value for a second carrier or cell that is not configured with the short TTI length configured for the UE, and transmitting the calculated PH value through an uplink (UL) channel on the first carrier wave or the cell, wherein the PH value for the second carrier wave or the cell is differently calculated and reported according to whether UL channel transmission on the second carrier wave or the cell in a subframe including a time point when the PH value is reported is scheduled.

15 Claims, 9 Drawing Sheets

(a)

(b)

Related U.S. Application Data

(60) Provisional application No. 62/645,137, filed on Mar. 19, 2018, provisional application No. 62/574,695, filed on Oct. 19, 2017, provisional application No. 62/565,017, filed on Sep. 28, 2017, provisional application No. 62/501,765, filed on May 5, 2017.

(51) Int. Cl.

| | | |
|---|---|---|
| *H04L 5/00* | (2006.01) | |
| *H04W 52/24* | (2009.01) | |
| *H04W 80/02* | (2009.01) | |
| *H04L 1/18* | (2006.01) | |
| *H04L 5/10* | (2006.01) | |
| *H04W 72/04* | (2009.01) | |
| *H04W 72/10* | (2009.01) | |

(52) U.S. Cl.
CPC .......... *H04L 5/0051* (2013.01); *H04L 5/0055* (2013.01); *H04L 5/0082* (2013.01); *H04L 5/10* (2013.01); *H04W 52/242* (2013.01); *H04W 72/0446* (2013.01); *H04W 72/0453* (2013.01); *H04W 72/10* (2013.01); *H04W 80/02* (2013.01)

(56) References Cited

U.S. PATENT DOCUMENTS

| | | | |
|---|---|---|---|
| 2015/0163791 A1* | 6/2015 | Chen | H04L 5/0057 455/426.1 |
| 2018/0152887 A1* | 5/2018 | Nammi | H04W 72/0446 |
| 2018/0249428 A1 | 8/2018 | Huang et al. | |
| 2018/0310254 A1* | 10/2018 | Jeong | H04W 52/146 |
| 2019/0075001 A1* | 3/2019 | Stern-Berkowitz | H04L 5/0048 |
| 2019/0098622 A1* | 3/2019 | Lee | H04W 72/042 |
| 2019/0104486 A1* | 4/2019 | Wei | H04W 52/18 |
| 2019/0253985 A1* | 8/2019 | Dinan | H04L 5/0007 |
| 2019/0268852 A1* | 8/2019 | Ryu | H04W 52/38 |
| 2019/0297602 A1* | 9/2019 | You | H04W 24/10 |
| 2019/0306874 A1* | 10/2019 | Lohr | H04W 72/14 |

OTHER PUBLICATIONS

ITRI, "Power headroom reporting issue for sTTI operation", R1-1702386 3GPP TSG RAN WG1 Meeting #88, Athens, Greece, Feb. 3, 2017.
Qualcomm Incorporated, "Discussion on PHR reporting for triggered UL grants in LAA," R1-1611569, 3GPP TSG RAN WG1 #87, Reno USA, Nov. 5, 2016.
United States Notice of Allowance in U.S. Appl. No. 16/065,763, dated Dec. 19, 2019, 12 pages.
United States Final Office Action in U.S. Appl. No. 16/065,763, dated Apr. 15, 2020, 11 pages.

* cited by examiner

FIG. 7
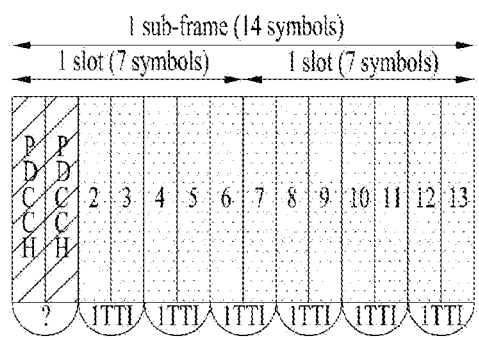
(a) 2 symbol TTI DL structure
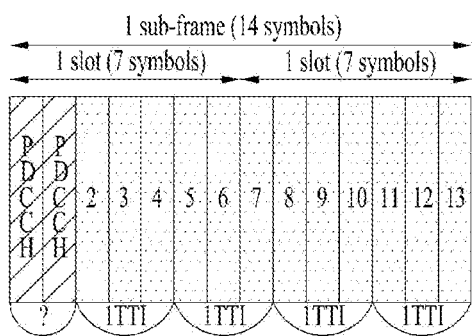
(b) 3 symbol TTI DL structure
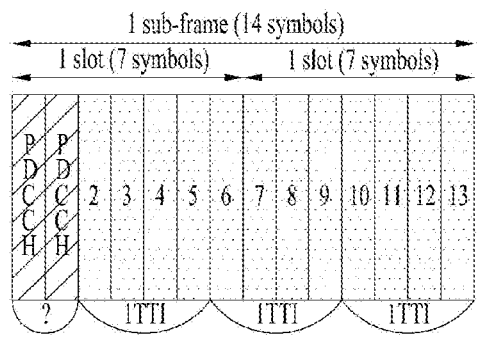
(c) 4 symbol TTI DL structure
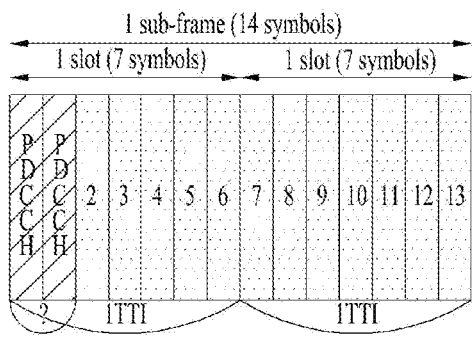
(d) 7 symbol TTI DL structure

METHOD AND APPARATUS FOR REPORTING POWER HEADROOM IN WIRELESS COMMUNICATION SYSTEM

CROSS-REFERENCE RELATED APPLICATIONS

The application is a continuation of U.S. application Ser. No. 16/065,763, filed on Jun. 22, 2018, which claims benefit to National Stage application under 35 U.S.C. § 371 of International Application No. PCT/KR2018/005167, filed on May 4, 2018, which claims the benefit of U.S. Provisional Application No. 62/645,137, filed on Mar. 19, 2018, U.S. Provisional Application No. 62/574,695, filed on Oct. 19, 2017, U.S. Provisional Application No. 62/565,017, filed on Sep. 28, 2017, and U.S. Provisional Application No. 62/501,765, filed on May 5, 2017. The disclosures of the prior applications are incorporated by reference in their entirety.

TECHNICAL FIELD

The present invention relates to a wireless communication system, and more particularly, to a method and apparatus for power headroom (PH) report related to supporting of a plurality of transmission time intervals, a plurality of subcarrier spacing, or a plurality processing times.

BACKGROUND ART

Latency of packet data is one of important performance metrics and one of important objectives in designs of a next-generation mobile communication system as well as LTE, a so-called new RAT, is to reduce latency and to provide rapider Internet access to an end user.

The present invention proposes a method of transmitting or receiving an uplink (UL) signal in a wireless communication system for supporting latency reduction.

DISCLOSURE

Technical Problem

An object of the present invention devised to solve the problem lies in power headroom (PH) report of a user equipment (UE) for supporting a plurality of transmission time intervals, a plurality of subcarrier spacing, or a plurality of processing times or a receiving operation of PH report of an eNB that communicates the UE.

It is to be understood that both the foregoing general description and the following detailed description of the present invention are exemplary and explanatory and are intended to provide further explanation of the invention as claimed.

Technical Solution

The object of the present invention can be achieved by providing a method for power headroom (PH) report for a terminal for supporting a short transmission time interval (TTI) length in a wireless communication system, the method being performed by the terminal and including, upon triggering the PH report, calculating a PH value for a first carrier wave or cell configured with the short TTI length configured for the terminal and a PH value for a second carrier or cell that is not configured with the short TTI length configured for the terminal, and transmitting the calculated PH value through an uplink (UL) channel on the first carrier or the cell, wherein the PH value for the second carrier or the cell is differently calculated according to whether UL channel transmission on the second carrier or the cell is scheduled in a subframe including a time point when the PH value is reported.

Additionally or alternatively, when the UL channel transmission on the second carrier or the cell is scheduled, the PH value for the second carrier or the cell may be a first PH value and, when the UL channel transmission on the second carrier or the cell is not scheduled, the PH value for the second carrier or the cell may be a second PH value.

Additionally or alternatively, the UL channel transmission on the second carrier or the cell may overleap with a transmission timing of UL channel transmissions on the first carrier or the cell and may be dropped or suspended.

Additionally or alternatively, the PH value for the first carrier or the cell or the PH value for the second carrier or the cell may be calculated in consideration of transmission power of a first UL channel among UL channels that overlap with each other and are scheduled to be transmitted in a reference TTI configured in each of the first carrier or the cell or the second carrier or the cell.

Additionally or alternatively, the PH report may be triggered when a path attenuation value calculated based on power of a specific reference signal is greater than a threshold value and the threshold value is determined depending on a length of the short TTI.

Additionally or alternatively, the UL channel on the first carrier or the cell may be selected according to a predetermined priority rule among a plurality of serving carriers or cells configured for the terminal.

Additionally or alternatively, the priority rule may be configured to allow a higher priority to a UL channel on a carrier or cell including hybrid automatic repeat request (HARD) acknowledgment/negative-acknowledgment (ACK/NACK), including a demodulation reference signal (DMRS), having a lower cell index, belonging to a cell group with a higher priority, and/or having a shorter TTI length.

In another aspect of the present invention, provided herein is a terminal for power headroom (PH) report for the UE for supporting a short transmission time interval (TTI) length in a wireless communication system, including a receiver and transmitter, and a processor that controls the receiver and the transmitter, wherein the processor upon triggering the PH report, calculates a PH value for a first carrier or cell configured with the short TTI length configured for the terminal and a PH value for a second carrier or cell that is not configured with the short TTI length configured for the terminal, and transmits the calculated PH value through an uplink (UL) channel on the first carrier or the cell, and wherein the PH value for the second carrier or the cell is differently calculated according to whether UL channel transmission on the second carrier or the cell is scheduled in a subframe including a time point when the PH value is reported and reported.

Additionally or alternatively, when the UL channel transmission on the second carrier or the cell is scheduled, the PH value for the second carrier or the cell may be a first PH value and, when the UL channel transmission on the second carrier or the cell is not scheduled, the PH value for the second carrier or the cell may be a second PH value.

Additionally or alternatively, the UL channel transmission on the second carrier or the cell may overleap with a transmission timing of UL channel transmissions on the first carrier or the cell and may be dropped or suspended.

Additionally or alternatively, the PH value for the first carrier or the cell or the PH value for the second carrier or the cell may be calculated in consideration of transmission power of a first UL channel among UL channels that overlap with each other and are scheduled to be transmitted in a reference TTI configured in each of the first carrier or the cell or the second carrier or the cell.

Additionally or alternatively, the PH report may be triggered when a path attenuation value calculated based on power of a specific reference signal is greater than a threshold value and the threshold value is determined depending on a length of the short TTI.

Additionally or alternatively, the UL channel on the first carrier or the cell may be selected according to a predetermined priority rule among a plurality of serving carriers or cells configured for the terminal.

Additionally or alternatively, the priority rule may be configured to allow a higher priority to a UL channel on a carrier or cell including hybrid automatic repeat request (HARD) acknowledgment/negative-acknowledgment (ACK/NACK), including a demodulation reference signal (DMRS), having a lower cell index, belonging to a cell group with higher priority, and/or having a shorter TTI length.

In another aspect of the present invention, provided herein is a method of receiving power headroom (PH) report for a terminal for supporting a short transmission time interval (TTI) length in a wireless communication system, the method being performed by a base station (BS) and including, upon triggering the PH report, receiving a PH value for a first carrier or cell configured with the short TTI length configured for the terminal and a PH value for a second carrier or cell that is not configured with the short TTI length configured for the terminal, which are calculated by the terminal, from an uplink (UL) channel on the first carrier or the cell, wherein the PH value for the second carrier or the cell is differently calculated according to whether UL channel transmission on the second carrier or the cell is scheduled in a subframe including a time point when the PH value is reported, and reported.

It is to be understood that both the foregoing general description and the following detailed description of the present invention are exemplary and explanatory and are intended to provide further explanation of the invention as claimed.

Advantageous Effects

According to embodiments of the present invention, uplink (UL) transmission of a terminal for supporting a plurality of transmission time interval (TTI) lengths, a plurality of subcarrier spacing, or a plurality of processing times may be effectively performed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 7 is a diagram showing a DL subframe structure including a short TTI with a plurality of lengths (symbol numbers);

BEST MODE

Figure 1:
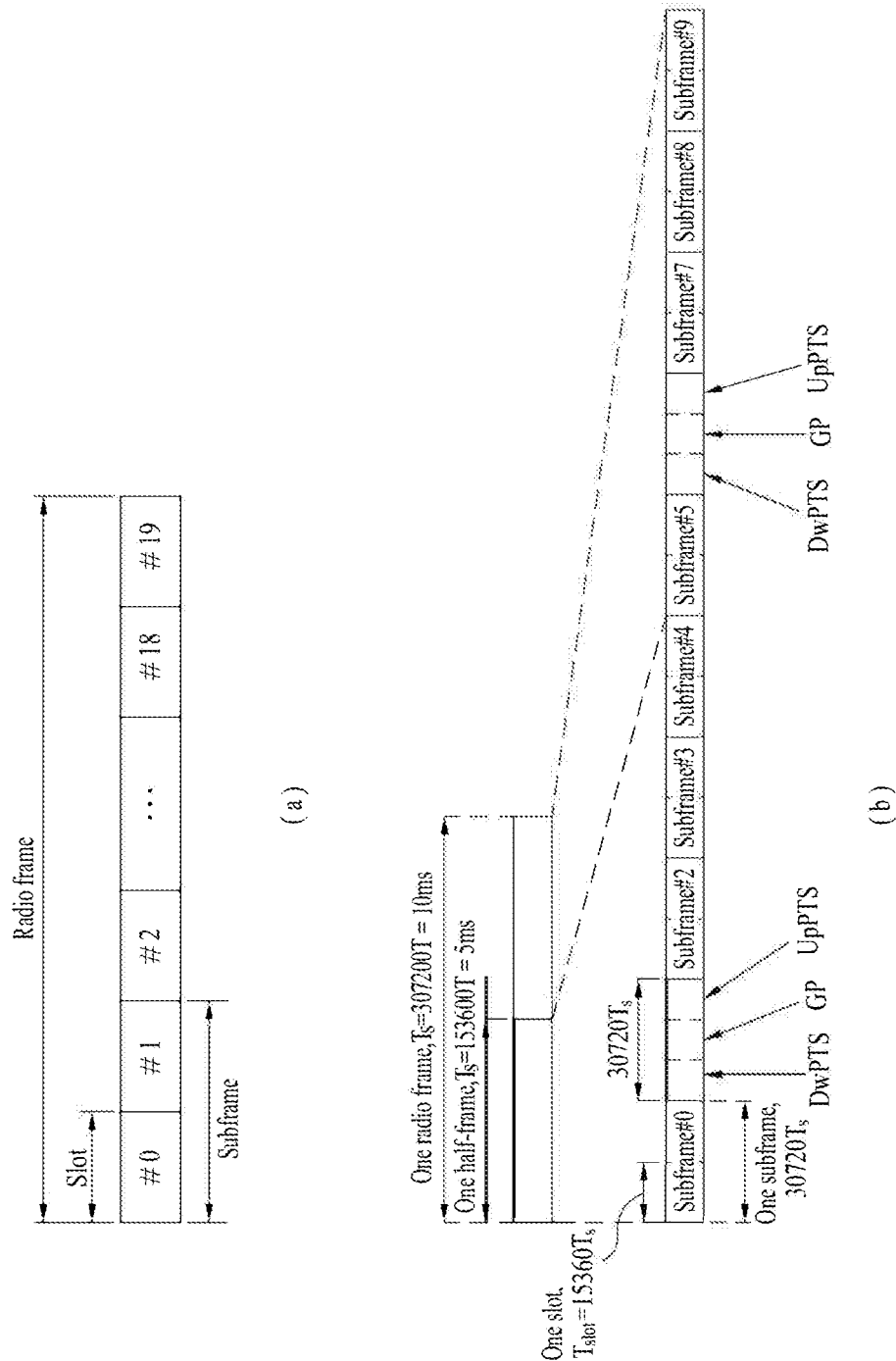
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
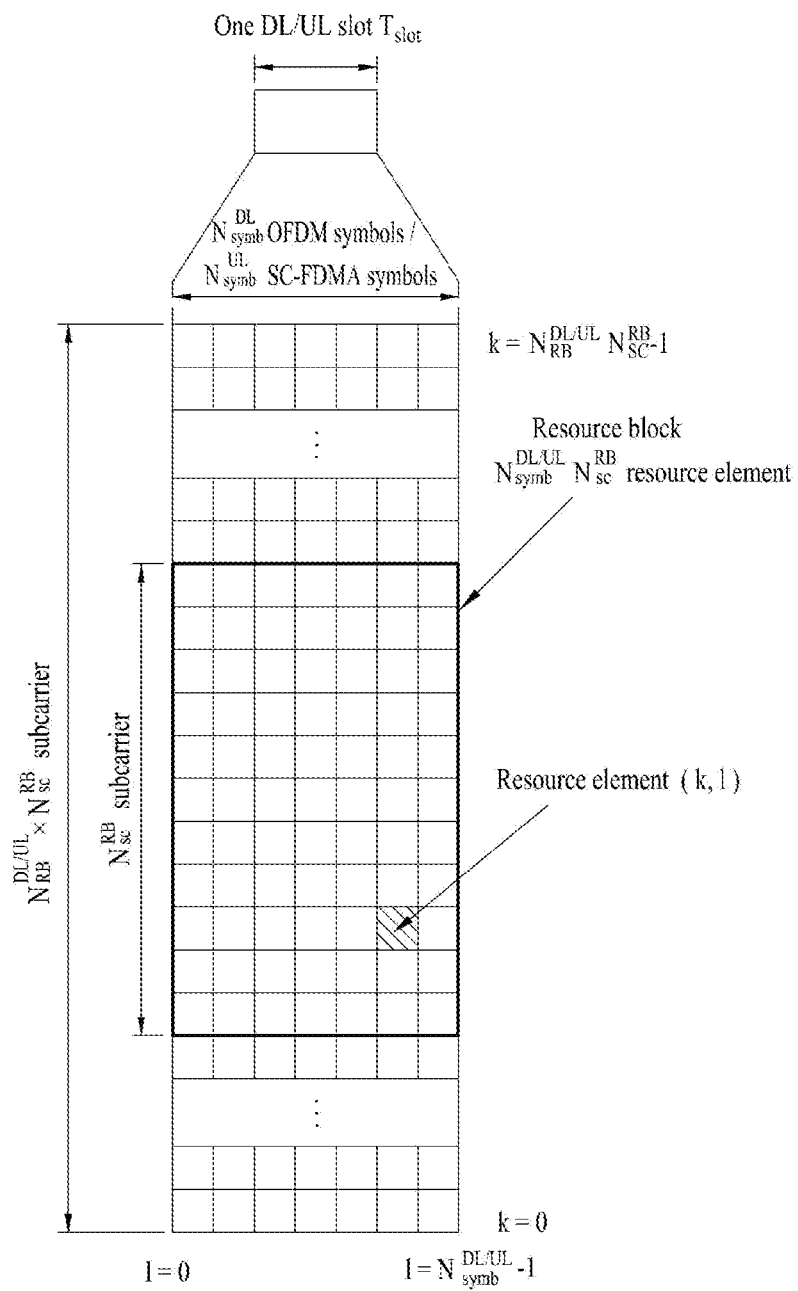
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone.

Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
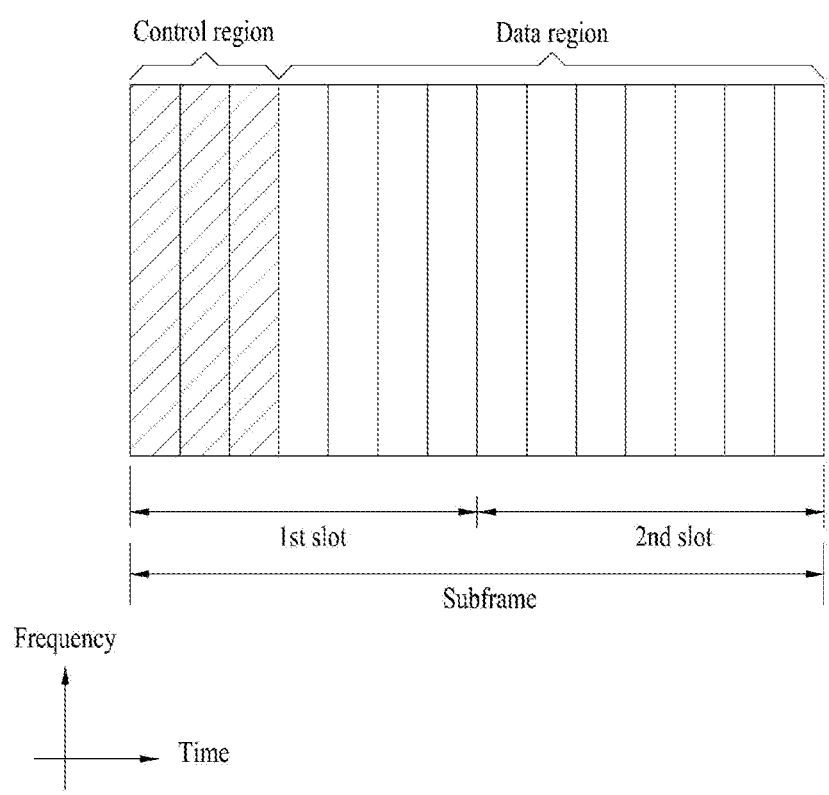
FIG. 3 is a diagram showing an example of a DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
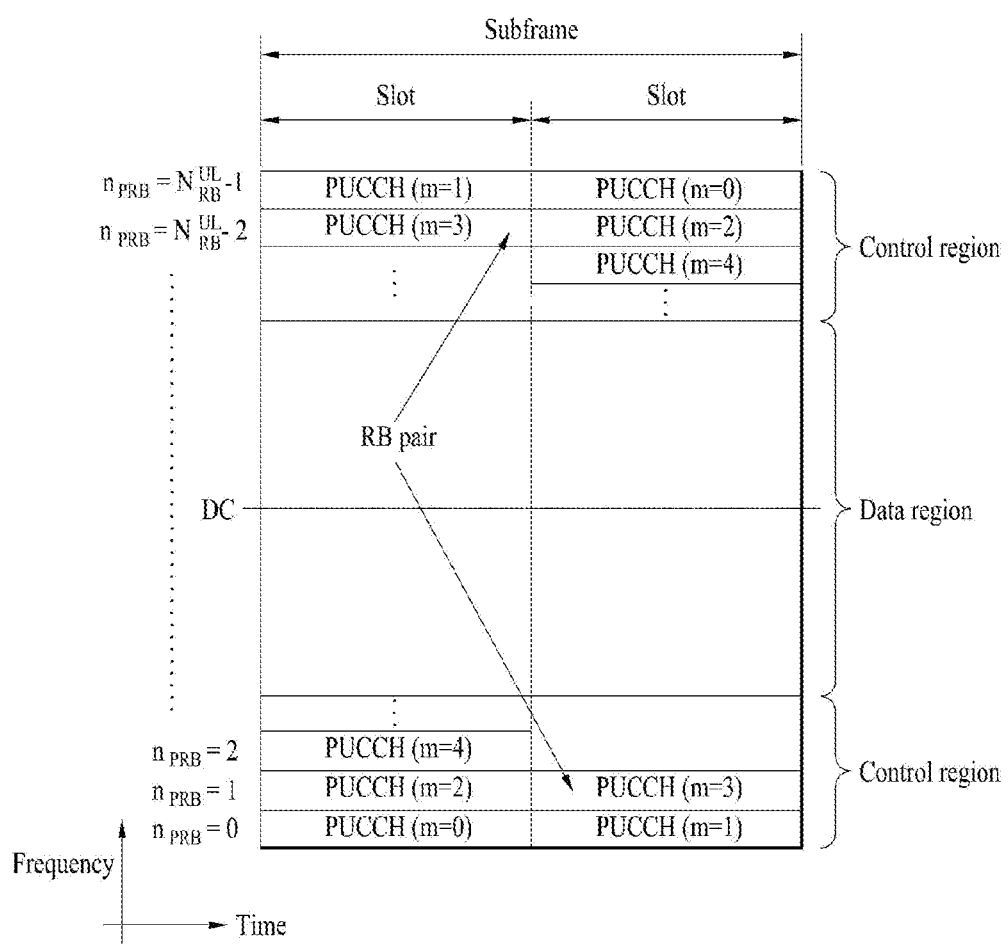
FIG. 4 is a diagram showing an example of a UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Power Headroom (PH) or PH Report (PHR)

A power headroom (PH) is described below.

The PH refers to surplus power that is additionally to be used except for power used for UL transmission by a current UE. For example, it is assumed that maximum transmission power that is UL transmission power in an allowable range of the UE is 10 W and the current UE uses power of 9 W in a frequency band of 10 Mhz. In this case, the UE is capable of additionally using 1 W and, thus, the PH is 1 W.

Here, when an eNB allocates a frequency band of 20 Mhz to a UE, power of 17 18 W (=9 W×2) may be required. However, maximum power of the UE is 10 W and, thus, when 20 Mhz is allocated to the UE, the UE may not be capable of using an entire portion of the frequency band or may not be capable of appropriately receiving a signal of the UE due to insufficient power. To overcome this problem, the UE may report that the PH is 1 W to the eNB and may enable the eNB to perform scheduling in a range of the PH. This report is referred to as power headroom report (PHR).

Through a PHR procedure, 1) information on a difference between maximum transmission power of a nominal UE for each activated serving cell and estimated UL-SCH (PUSCH) transmission power, 2) information on a difference between maximum transmission power of a nominal UE and transmission power of an estimated PUCCH in a primary serving cell, or 3) information on a difference between nominal maximum transmission power and estimated UL-SCH and PUCCH transmission power in a primary serving cell may be transmitted to a serving eNB.

PHR of a UE may be defined as two types (Type 1 and Type 2). PH of a temporary UE may be defined with respect to a subslot/slot/subframe i of a serving cell c.

1. Type 1 of PH (Type 1 PH)

Type 1 PH may include the case in which 1) the UE transmits only PUSCH without PUCCH, 2) the UE simultaneously transmits PUCCH and PUSCH, and 3) the UE does not transmit PUSCH.

First, when the UE transmits PUSCH without PUCCH in a subslot/slot/subframe i with respect to a serving cell c, PH with respect to Type 1 report may be represented according to the following equation.

$$PH_{type1,c}(i) = P_{CMAX,c}(i) - \{10 \log_{10}(M_{PUSCH,c}(i) + P_{O\_PUSCH,c}(j) + \alpha_c(j) \cdot PL_c + \Delta_{TF,c}(i) + f_c(i)\}[dB]$$ [Equation 1]

Here, $P_{CMAX,c}(i)$ is a value obtained by converting maximum UE output power $\tilde{P}_{CMAX,c}(i)$ configured with respect to a serving cell c in a subslot/slot/subframe i into a decibel value [dB].

Here, $P_{CMAX,c}(i)$ refers a maximum UE output power value calculated by applying offset values configured in a network based on a maximum transmission power value configured based on a smaller value among a $P_{EMAX,c}$ value configured based on P-max that is a value transmitted to the UE via RRC signaling by an eNB and a $P_{PowerClass}$ value determined based on output power class determined by a level of hardware of each UE. Here, the offset values may be maximum power reduction (MPR), additional maximum power reduction (A-MPR), or power management maximum power reduction (P-MPR) and, in addition, an offset value (DTC) applied according to whether a current band is a band that highly is influenced by filter characteristics in a transmitter of the UE may be applied.

The $P_{CMAX,c}(i)$ is a value configured with respect to only a serving cell c unlike $P_{CMAX}(i)$. Accordingly, the P-max value may also be a value $P_{EMAX,c}$ configured with respect to a serving cell c and the offset values may also be calculated as a value configured with respect to only a serving cell c. That is, the offset values may include MPRc, A-MPRc, P-MPRc, and DTC,c. However, a PPowerClass value may be calculated using the same value as a value that is used during calculation on a UE basis.

$M_{PUSCH,c}(i)$ is a value that represents a bandwidth of a resource with PUSCH allocated thereto in a subslot/slot/subframe i with respect to a serving cell c, as the number of RBs.

$P_{O\_PUSCH,c}(j)$ is the sum of $P_{O\_NOMINAL\_PUSCH,c}(j)$ and $P_{O\_UE\_PUSCH,c}(j)$ with respect to a serving cell c and j is 0 or 1 from a high layer. In the case of semi-persistent grant PUSCH transmission (or retransmission), j may be 0 and, on the other hand, in the case of dynamic scheduled grant PUSCH transmission (or retransmission), j may be 1 and, in the case of random access response grant PUSCH transmission (or retransmission), j may be 2. In the case of random access response grant PUSCH transmission (or retransmission), $P_{O\_UE\_PUSCH,c}(2)=0$ may be satisfied and $P_{O\_NOMINAL\_PUSCH,c}(2)$ may be the sum of $P_{O\_PRE}$ and $\Delta_{PREAMBLE\_Msg3}$. Here, parameter $P_{O\_PRE}$ (preambleInitialReceivedTargetPower) and $\Delta_{PREAMBLE\_Msg3}$ may be signaled from a high layer.

When j is 0 or 1, one may be selected from values of $\alpha_c \in \{0, 0.4, 0.5, 0.6, 0.7, 0.8, 0.9, 1\}$ by a 3-bit parameter provided by a high layer. When j is 2, $\alpha_c(j)=1$ may be satisfied.

$PL_c$ may be a dB value of an estimated value of UL path loss (PL) or path attenuation with respect to a serving cell c, calculated by the UE, and may be calculated from "referenceSignalPower−higher layer filtered RSRP". Here, referenceSignalPower may be a value from a high layer and may have a unit of dBm of an energy per resource element (EPRE) value of a DL reference signal. Reference signal received power (RSRP) may a reception power value of a reference signal with respect to a reference serving cell. Determination of referenceSignalPower and higher layer filtered RSRP that are used to calculate the serving cell selected as a reference serving cell and the $PL_c$ may be configured by pathlossReferenceLinking that is a high layer parameter. Here, the reference serving cell configured with the pathlossReferenceLinking may be a DL SCC of a secondary serving cell that is configured with SIB2 connection with a primary serving cell or UL CC.

$\Delta_{TF,c}(i)$ is a parameter for applying influence of a modulation coding scheme (MCS) and $\Delta_{TF,c}(i)=10 \log_{10}((2^{BPRE \cdot K_s}-1) \cdot \beta_{offset}^{PUSCH})$ may be satisfied. Here, $K_s$ is a parameter provided in deltaMCS-Enabled by a high layer with respect to each serving cell c and is 1.25 or 0 and, in particular, in the case of transmission mode 2 that is a mode for transmit diversity, Ks may always be 0. When only control information is transmitted through PUSCH without UL-SCH data, $BPRE=O_{CQI}/N_{RE}$ and, in the other cases, $$BPRE = \sum_{r=0}^{C-1} K_r / N_{RE}$$

where C is the number of code blocks, Kr is a size of a code block, $O_{CQI}$ is a CQI/PMI bit number including a CRC bit number, and $N_{RE}$ is the number of determined resource elements (i.e., $N_{RE}=M_{SC}^{PUSCH-initial} \cdot N_{symbol}^{PUSCH-initial}$). When only control information is transmitted without UL-SCH data through PUSCH, $\beta_{offset}^{PUSCH}=\beta_{offset}^{CQI}$ may be configured and, in the other cases, $\beta_{offset}^{PUSCH}$ may always be configured as 1.

$\delta_{PUSCH,c}$ may be a correction value and may be determined with reference to a TPC command present DCI format 0 or DCI format 4 with respect to a serving cell c or a TPC command in DCI format 3/3A that is commonly encoded and transmitted with other UEs. The DCI format 3/3A may have CRC parity bits scrambled with TPC-PUSCH-RNTI and, thus, may be checked by only UEs to which the RNTI value is allocated. Here, when a temporary UE is configured with a plurality of serving cells, the RNTI value may be allocated with different RNTI values for respective serving cells to identify each serving cell. In this case, a PUSCH power control adjustment state with respect to a current serving cell c may be given by fc(i) and, when accumulation is activated by a high layer with respect to a serving cell c or DCI format 0 formed by scrambling TPC command 6PUSCH,c with temporary-C-RNTI is included in PDCCH, "$f_c(i)=f_c(i-1)+\delta_{PUSCH,c}(i-K_{PUSCH})$" may be satisfied. Here, $\delta_{PUSCH,c}(i-K_{PUSCH})$ may be a TPC command present in DCI format 0/4 or 3/3A in PDCCH transmitted in an $(i-K_{PUSCH})^{th}$ subframe and fc(0) may be a first value after accumulation reset. A value $K_{PUSCH}$ may be 4 in the case of FDD. When a TDD UL/DL configuration is 0 and PDCCH for scheduling PUSCH transmission in subframe 2 or 7 is present, if a least significant bit (LSB) value of a UL index in DCI format 0/4 in the PDCCH is configured as 1, KPUSCH may be 7.

Second, when the UE simultaneously transmits PUCCH and PUSCH in a subslot/slot/subframe i with respect to a serving cell c, Type 1 PH may be represented by the following equation.

$$PH_{type1,c}(i)=\tilde{P}_{CMAX,c}(i)-\{10\log_{10}(M_{PUSCH,c}(i))+P_{O\_PUSCH,c}(j)+\alpha_c(j) \cdot PL_c+\Delta_{TF,c}(i)+f_c(i)\}[dB] \quad \text{[Equation 2]}$$

Here, $\tilde{P}_{CMAX,c}(i)$ may be a value calculated assuming that only PUSCH is transmitted in a sub slot/slot/subframe i. In this case, a physical layer may transmit $\tilde{P}_{CMAX,c}(i)$ instead of PCMAX,c(i) to a high layer.

Third, when the UE does not transmit PUSCH in a subslot/slot/subframe i with respect to a serving cell c, Type 1 PH may be represented according to the following equation.

$$PH_{type1,c}(i)=\tilde{P}_{CMAX,c}(i)-\{P_{O-PUSCH,c}(1)+\alpha_c(1) \cdot PL_c+f_c(i)\}[dB] \quad \text{[Equation 3]}$$

2. Type 2 of PH (Type 2 PH)

Type 2 PH may include the case in which the UE simultaneously transmits PUCCH and PUSCH in a subslot/slot/subframe i with respect to a primary serving cell, the case in which the UE transmits PUSCH without PUCCH, the case in which the UE transmits PUCCH without PUSCH, and the case in which the UE does not transmit PUCCH or PUSCH.

First, when the UE simultaneously transmits PUCCH and PUSCH in a subslot/slot/subframe i with respect to a primary serving cell, Type 2 PH may be calculated according to the following equation.

[Equation 4]

$$PH_{type2}(i) = P_{CMAX,c}(i) - 10\log_{10}\left( 10^{(10\log_{10}(M_{PUSCH,c}(i))+P_{O\_PUSCH,c}(j)+\alpha_c(j) \cdot PL_c+\Delta_{TF,c}(i)+f_c(i))/10} + 10^{(P_{0\_PUCCH}+PL_c+h(n_{CQI},n_{HARQ},n_{SR})+\Delta_{F\_PUCCH}(F)+\Delta_{TxD}(F')+g(i))/10} \right)$$

Here, $\Delta_{F\_PUCCH}(F)$ may be defined by a high layer (RRC) and each $\Delta_{F\_PUCCH}(F)$ value may correspond to a PUCCH format (F) related to a PUCCH format 1a. Here, each PUCCH format (F) is shown in Table 4 above.

When the UE configures PUCCH transmission with respect to two antenna ports via a high layer, a $\Delta_{TxD}(F')$ value with respect to each PUCCH format F' may be provided by a high layer. Otherwise, $\Delta_{TxD}(F)=0$ may always be satisfied.

In addition, $h(n_{CQI}, n_{HARQ}, n_{SR})$ may have different values for respective PUCCH formats. Here, $n_{CQI}$ is a bit number of channel quality information (CQI) information. When a scheduling request (SR) is configured in a subslot/slot/subframe i and a SR configuration is not present in a transmission block related to UL-SCH of the UE, $n_{SR}=1$ may be satisfied and, in the other cases, $n_{SR}=0$ may be satisfied. When the UE is configured in one serving cell, $n_{HARQ}$ is a HARQ-ACK bit number transmitted in a subslot/slot/subframe i. When the UE is configured in one or more serving cells with respect to PUCCH format 1b of channel selection, $h(n_{CQI}, n_{HARQ}, n_{SR}) = (n_{HARQ}-1)/2$ may be satisfied and, in the other cases, $h(n_{CQI}, n_{HARQ}, n_{SR})=0$ may be satisfied. With respect to PUCCH format 2/2a/2b and normal cyclic prefix, when nCQI is equal to or greater than 4, $h(n_{CQI}, n_{HARQ}, n_{SR}) = 10 \log_{10}(n_{CQI}/4)$ may be satisfied and, in the other cases, $h(n_{CQI}, n_{HARQ}, n_{SR})=0$ may be satisfied. With respect to PUCCH format 2 and extended cyclic prefix, when "$n_{CQI}+n_{HARQ}$" is equal to or greater than 4, $h(n_{CQI}, n_{HARQ}, n_{SR}) = 10 \log_{10}((n_{CQI}+n_{HARQ})/4)$ may be satisfied and, in the other cases, $h(n_{CQI}, n_{HARQ}, n_{SR})=0$ may be satisfied. With respect to PUCCH format 3, when the UE is configured to transmit PUCCH in 2 antenna port via a high layer or is configured to transmit HARQ-ACK/SR of 11 bits, $h(n_{CQI}, n_{HARQ}, n_{SR}) = (n_{HARQ}+n_{SR}-1)/3$ may be satisfied and, in the other cases, $h(n_{CQI}, n_{HARQ}, n_{SR}) = (n_{HARQ}+n_{SR}-1)/2$ may be satisfied. $P_{O\_PUCCH}$ is a parameter configured by the sum of a $P_{O\_NOMINAL\_PUCCH}$ parameter and a $P_{O\_UE\_PUCCH}$ parameter that are provided by a high layer.

Second, when the UE transmits PUSCH without PUCCH in a subslot/slot/subframe i with respect to a primary serving cell, Type 2 PH may be calculated according to the following equation

[Equation 5]
$$PH_{type2}(i) = P_{CMAX,c}(i) - 10\log_{10}\left(10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{0\_PUCCH}+PL_c+g(i))/10}\right)[dB]$$

Third, when the UE transmits PUCCH without PUSCH in a subslot/slot/subframe i with respect to a primary serving cell, Type 2 PH may be calculated according to the following equation.

[Equation 6]
$$PH_{type2}(i) = P_{CMAX,c}(i) - 10\log_{10}\left(10^{(P_{O\_PUSCH,c}(1)+\alpha_c(1)\cdot PL_c+f_c(i))/10} + 10^{(P_{0\_PUCCH}+PL_c+h(n_{CQI},n_{HARQ},n_{SR})+\Delta_{F\_PUCCH}(F)+\Delta_{TxD}(F')+g(i))/10}\right)[dB]$$

Fourth, when the UE does not transmit PUCCH or PUSCH in a subslot/slot/subframe i with respect to a primary serving cell, Type 2 PH may be calculated according to the following equation.

[Equation 7]
$$PH_{type2}(i) = \tilde{P}_{CMAX,c}(i) - 10\log_{10}\left(10^{(P_{O\_PUSCH,c}(1)+\alpha_c(1)\cdot PL_c+f_c(i))/10} + 10^{(P_{0\_PUCCH}+PL_c+g(i))/10}\right)[dB]$$

Here, $\tilde{P}_{CMAX,c}(i)$ may be calculated assuming that MPR is 0 dB, A-MPR is 0 dB, P-MPR is 0 dB, and $\Delta T_C$ is 0 dB.

A PH value may be determined in a unit of 1 dB and may be determined as a value closest to a value in a range between 40 dB and −23 dB via round off. The determined PH value may be transmitted to a high layer from a physical layer.

The reported PH may be an estimated value in one subslot/slot/subframe.

When an extended PHR (hereinafter, extended PHR) is not configured, only Type 1 PH value with respect to a primary serving cell may be reported. On the other hand, when the extended PHR is configured, Type 1 PH and Type 2 PH values may be reported with respect to each of serving cells that are configured with UL and activated.

Control of the PHR may be possible through a periodicPHR-Timer (hereinafter, "periodic timer") and a prohibit-PHR-Timer. A "dl-PathlossChange" value may be transmitted through an RRC message and, thus, the UE may control triggering of PHR due to a change in a path loss value measured in UL and a change of required power backoff due to power management (P-MPR).

The PHR may be triggered when at least one of the following events occurs.

1. When a path loss value (e.g., a path loss estimated value measured by a UE) is largely changed in a at least one activated serving cell used for path loss reference and a prohibit timer expires after the UE ensures a UL resource and transmits last PHR for new transmission or when the prohibit timer expires and a path loss value (dB) is more largely changed in at least one activated serving cell used for path loss reference, the PHR may be triggered. The path loss estimated value may be measured by the UE based on the RSRP.

prohibitPHR-Timer expires or has expired and the path loss has changed more than dl-PathlossChange dB for at least one activated Serving Cell which is used as a pathloss reference since the last transmission of a PHR when the UE has UL resources for new transmission;

2. When the periodic timer expires, the PHR may be triggered. Since PH is frequently changed, if the periodic timer expires, the UE may trigger the PHR and, if the PH is reported, the UE may re-drive the periodic timer, according to a periodic PHR method. Accordingly, when the periodic timer expires, the UE may trigger the PHR and, when the PH is reported, the UE may re-drive the periodic timer.

periodicPHR-Timer expires;

3. When a configuration or re-configuration related to a PHR operation except for use prohibition is performed via a high layer such as RRC or MAC, the PHR may be triggered.

upon configuration or reconfiguration of the power headroom reporting functionality by upper layers, which is not used to disable the function;

4. When SCell configured with UL is activated, the PHR may be triggered.

activation of an SCell with configured uplink;

5. When the UE ensures a UL resource for new transmission, if resource allocation for UL transmission is performed or PUCCH transmission is present in a corresponding cell after even any one of activated serving cells configured with UL performs UL data transmission through a UL transmission resource or last PHR transmission during PUCCH transmission in a corresponding TTI, and when a change in required power backoff due to power management (P-MPRc) after last PHR transmission is greater than a value of "dl-PathlossChange" [dB], the PHR may be triggered.

prohibitPHR-Timer expires or has expired, when the UE has UL resources for new transmission, and the following is true in this TTI for any of the actived Serving Cells with configured uplink:

there are UL resources allocated for transmission or there is a PUCCH transmission on this cell, and the required power backoff due to power management (as allowed by P-MPRc) for this cell has changed more than dl-PathlossChange dB since the last transmission of a PHR when the UE had UL resources allocated for transmission or PUCCH transmission on this cell;

As an example of triggering, when the UE is allocated with a resource for new transmission with respect to a corresponding TTI, three following steps may be performed.

(1) In the case of first UL resource allocation for new transmission after last MAC is reset, the periodic timer may be started.

(2) When at least one PHR after last PHR transmission is triggered or the transmitted PHR is first triggered PHR and allocated UL resources provide a sufficient space to transmit a PHR MAC control element (including extended PHR), 1) if extended PHR is configured, a Type 1 PH value may be acquired with respect to an activated serving cell and, if the UE is allocated with a UL resource for UL transmission through a corresponding serving cell in a corresponding TTI, a value corresponding to a PCMAX,c field may be acquired from a physical layer, and an extended power headroom report MAC control element (extended PHR MAC CE) may be generated and transmitted.

2) if the extended PHR is configured and simultaneous-PUCCH-PUSCH is configured, a Type 2 PH value of a primary serving cell may be acquired and, if the UE transmits PUCCH in the corresponding TTI, a value corresponding to a PCMAX,c field may be acquired from a physical layer. In addition, the extended PHR MAC CE may be generated and transmitted, and 3) if the extended PHR is not configured, a Type 1 PH value may be acquired from a physical layer and a PHR MAC control element may be generated and transmitted.

(3) The UE may start or restart the periodic timer, may start or restart the prohibit timer, and may cancel entire triggered PHR.

Figure 5:
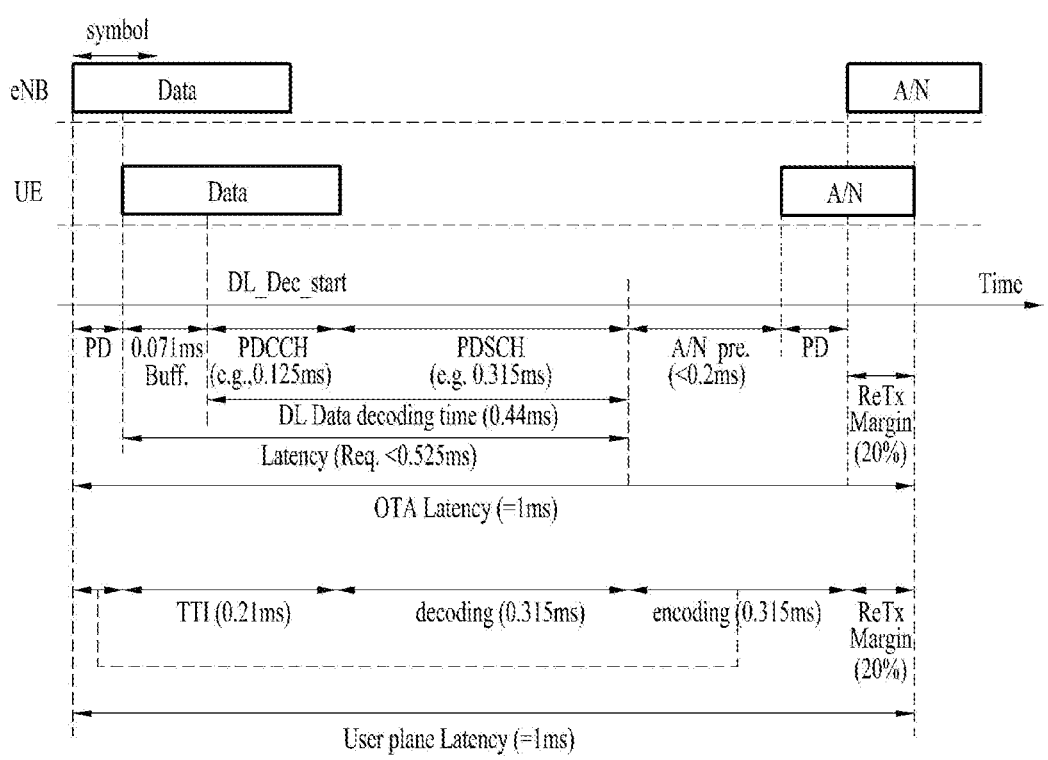
FIG. 5 is a diagram showing reduction in a TTI length according to reduction in user plane latency.

To satisfy the aforementioned reduction in latency, i.e., low latency, it may be required to reduce TTI that is a minimum unit of data transmission to newly design a shortened TTI (sTTI) of 0.5 msec or less. For example, as illustrated in FIG. 5, to shorten user plane (U-plane) latency to a time point when a UE completely transmits ACK/NACK (A/N) from a time point when an eNB begins to transmit data (PDCCH and PDSCH) to 1 msec, a sTTI may be configured in units of about 3 OFDM symbols.

Figure 6:
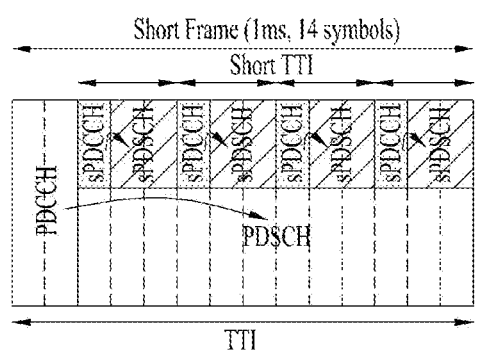
FIG. 6 is a diagram showing an example in which a plurality of short TTIs is set in one subframe.

In a DL environment, a PDCCH (i.e., sPDCCH) for data transmission/scheduling in such a sTTI and a PDSCH (i.e., sPDSCH) for transmission in the sTTI may be transmitted and, for example, as illustrated in FIG. 6, a plurality of sTTIs may be configured using different OFDM symbols in one subframe. Particularly, OFDM symbols included in the sTTI may be configured by excluding OFDM symbols transmitted by legacy control channels. The sPDCCH and the sPDSCH may be transmitted in the sTTI in the form of time division multiplexing (TDM) using different OFDM symbol regions and may be transmitted in the form of frequency division multiplexing (FDM) using different PRB domain/frequency resources.

In a UL environment as similar with the DL environment, data transmission/scheduling in a sTTI is allowed, channels corresponding to a legacy TTI based PUCCH and PUSCH are referred to as sPUCCH and sPUSCH, respectively.

In the specification, the present invention is described below in terms of an LTE/LTE-A system. In an existing LTE/LTE-A, when having a normal CP, a subframe of 1 ms may include 14 OFDM symbols and, when a symbol is configured with a TTI in a shorter unit than 1 ms, a plurality of TTIs may be configured in one subframe. A method of configuring a plurality of TTIs may configure two symbols, three symbols, four symbols, and seven symbols as one TTI, as in an embodiment shown in FIG. 7 below. Although not shown, the case in which one symbol is configured as a TTI may also be configured. When one symbol is one TTI unit, 12 TTIs may be generated on the assumption that a legacy PDCCH is transmitted in two OFDM symbols. Similarly, as shown in FIG. 7A, when two symbols correspond to one TTI unit, 6 TTIs may be generated, as shown in FIG. 7B, when three symbols correspond to one TTI unit, 4 TTIs may be generated and, as shown in FIG. 7C, when four symbols correspond to one TTI unit, 3 TTIs may be generated. Needless to say, in this case, first two OFDM symbols may be assumed to transmit a legacy PDCCH.

As shown in FIG. 7D, when seven symbols are configured with one TTI, one TTI of seven symbol units including a legacy PDCCH and seven subsequent symbols may be configured as one TTI. In this case, in the case of a UE that supports a sTTI, when one TTI includes seven symbols, it may be assumed that puncture or rate-matching is performed on two OFDM symbols positioned at a fore end for transmitting a legacy PDCCH with respect to a TTI (first symbol) positioned at a fore end of one subframe and it may be assumed that corresponding data and/or control information are transmitted in five symbols. On the other hand, it may be assumed that a UE is capable of transmitting data and/or control information all seven symbols without a punctured or rate-matched resource region with respect to a TTI (second slot) positioned at a rear end of one subframe.

Figure 8:
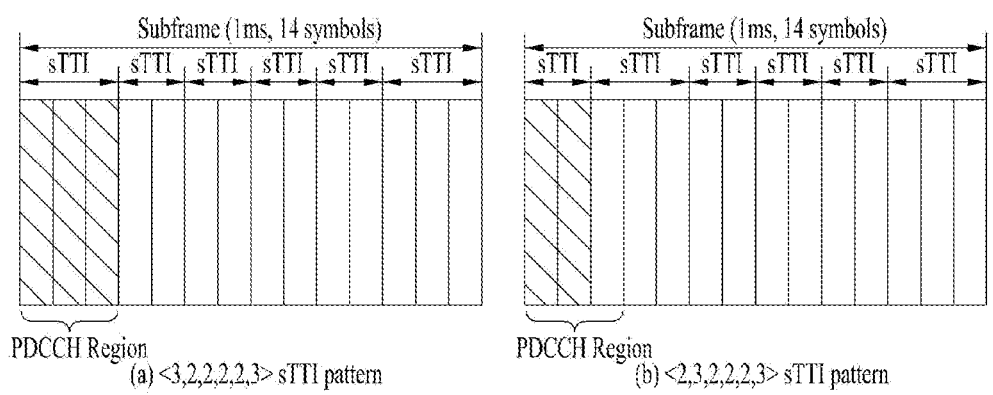
FIG. 8 is a diagram showing a DL subframe structure including a short TTI including two or three symbols.

According to the present invention, a sTTI including two OFDM symbols (hereinafter, "OS") and a sTTI including three OSs may be considered to include sTTI structures that are combined and present in one subframe, as shown in FIG. 8. The sTTI including 2-OS or 3-OS sTTIs may be simply defined as 2-symbol sTTI (i.e., 2-OS sTTI). Also, 2-symbol sTTI or 3-symbol sTTI may be simply referred to as 2-symbol TTI or 3-symbol TTI, respectively, and it is clear that these are TTIs shorter than the 1 ms TTI, which is the legacy TTI, which is the premise of the present invention. That is, in the specification, the term "TTI" is referred to instead of sTTI, the term TTI means the sTTI, and regardless of its name, what the present invention proposes is a communication scheme in a system composed of TTIs shorter than a legacy TTI.

Also, in this specification, numerology refers to defining a length of a TTI to be applied to the wireless communication system, a subcarrier interval and the like, or a parameter or a communication structure or system based on the parameter such as the defined length of the TTI or sub-carrier spacing.

As shown in FIG. 8A, a sPDCCH may also be transmitted depending on the number of symbols of a PDCCH in a <3,2,2,2,2,3> sTTI pattern. In a <2,3,2,2,2,3> sTTI pattern of FIG. 8B, it may be difficult to transmit an sPDCCH due to a legacy PDCCH region.

NR (New Radio Technology)

Although the structure, operation or function of the 3GPP LTE (-A) system has been described in the above description, the structure, operation, or function in the 3GPP LTE (-A) in the NR is slightly modified, Can be set. Let me briefly explain some of them.

In NR, various numerology (numerology) are supported. For example, subcarrier spacing (subcarrier spacing) is supported not only at 15 KHz, but also up to 2n times (n=1, 2, 3, 4).

The number of OFDM symbols per slot (hereinafter simply referred to as "symbol") is fixed to 14, but the number of slots in one subframe is 2k (k=0, 1, 2, 3, 4, 5). However, it is the same as the existing LTE system that the radio frame is composed of 10 subframes. In case of extended CP, the number of symbols per slot is fixed to 12, and one subframe consists of 4 slots. In addition, like the existing LTE system, one resource block is defined as 12 consecutive subcarriers in the frequency domain.

Also, the purpose (for example, downlink, uplink, or flexible) of each symbol in a slot is defined according to the slot format, and both the downlink symbol and the uplink symbol can be set in one slot, And this case is referred to as a self-contained subframe (or slot) structure.

Power Headroom Report (PHR) for Different TTI Lengths/Numerologies

In general, in an LTE system, a UE may calculate a power headroom (PH) with respect to each configured cell and may report the PH to a BS (or eNB) via MAC signaling or RRC signaling periodically or when a specific event is satisfied. Here, a period of PH report may be controlled by a timer for PHR triggering. As an example of the specific event, when a path loss value calculated based on specific reference signal (RS) power is greater than a predetermined threshold value, PHR transmission may be triggered. In addition, a size of padding for match with a scheduled transport block size is greater than (or equal to or greater than) a size of PHR transmission, PHR information instead of padding may be inserted.

In this case, a PH value of an arbitrary cell transmitted in an arbitrary subslot/slot/subframe may be basically a difference value between Pcmax,c that is maximum allowable power with respect to a corresponding cell c calculated in a corresponding subframe and transmission power of a signal transmitted through a corresponding cell in a corresponding subslot/slot/subframe. Alternatively, a PH value is a difference value between Pcmax,c that is maximum allowable power with respect to a corresponding cell c and virtually calculated transmission power when the UE does not transmit a signal through a corresponding cell in a corresponding subslot/slot/subframe (that is, as if the UE does not transmit PUSCH in a subslot/slot/subframe i with respect to a serving cell c from the aforementioned Type 1 or Type 2 PH calculation method). In this case, a Pcmax,c value in an arbitrary subslot/slot/subframe may be obtained by calculating maximum power for transmission in a corresponding cell in a condition in which the UE satisfies limited requirements in consideration of all transmissions of a corresponding cell or other cells in a corresponding subslot/slot/subframe may be calculated.

As one proposal of the present invention, a rule may be defined to calculate/report separate PH by a UE for each TTI length (and/or for each numerology) in a situation in which a plurality of UL channels with different TTI lengths (or numerologies) are to be scheduled in one carrier (or cell).

Alternatively, separate configuration of a reference TTI length (or numerology) for PHR transmission may be considered. In this case, even if one PHR is capable of being transmitted and a plurality of UL CCs are present, a reference TTI length (or numerology) may be assumed to be configured as one. The reference TTI length (or numerology) may be configured via a high layer or may comply with a default TTI length (or numerology) of PCell and/or PSCell (PUCCH SCell). Alternatively, the reference TTI length (or numerology) may be assumed to be always a predetermined value, for example, 1 ms TTI (or 15 kHz). Alternatively, the reference TTI length (or numerology) may comply with the shortest TTI length and/or the longest subcarrier spacing configured in one carrier. This configuration may be useful when different numerologies or different TTI lengths are multiplexed in, particularly, one carrier.

As another proposal of the present invention, a rule may be defined to configure a group for each TTI length and/or for each numerology or for each of a plurality of TTI lengths and/or each of a plurality of numerologies and to collect PHR values in a group and to report a PHR value of a corresponding group as PUSCH of a representative cell or PUSCH of one cell. Alternatively, a rule may be defined to group a cell configured with a specific (e.g., different from reference TTI length/numerology) TTI length (or numerology) and cell that are not configured, to collect PHR values in cells in each group and, then, to report a PHR value to a specific cell in each group. This means that PHRs are grouped and reported between cells with similar processing times. One trigger timer with respect to this PHR may be shared. For example, when cells 1 and 2 are configured with sTTI and cells 3 and 4 are not configured with sTTI, a rule may be defined to collect and report PHRs of cells 1 and 2 and to collect and report PHRs of cells 3 and 4.

As another proposal of the present invention, a timer (e.g., prohibitPHR-Timer, periodicPHR-Timer) for power headroom report (PHR) trigger may be defined for each TTI length (for each numerology, for each TTI length, or for each numerology group). Alternatively, even if separate PH for each TTI length (for each numerology, for each TTI length, or for each numerology group) is reported, a timer for PHR trigger may be used or configured as a timer with a specific TTI length (or numerology) and, accordingly, the PHR may be triggered and the specific TTI length or the numerology may be predetermined or may be configured via a high layer signal.

As another proposal of the present invention, simultaneous transmission with respect to a plurality of UL channels with different TTI lengths/numerologies may not be allowed or not configured or a UL channel with a specific TTI length/numerology may be dropped via collision handling. When the dropped channel includes PHR in the above situation, the drop operation may not be appropriate. Accordingly, when the channel including the PHR is dropped, a rule may be defined to re-trigger PHR with respect to the corresponding TTI length/numerology.

As another proposal of the present invention, assuming that PHR is reported with respect to specific reference numerology or TTI length, this may be assumed to be a situation in which another TTI length is not configured. For example, when a legacy TTI (e.g., 1 msec) and two OFDM symbol (OS) sTTIs are configured, if PHR is increased with respect to the legacy TTI, the UE may calculate PHR assuming that 2 OS sTTIs are not configured. Accordingly, a transmitted channel after collision between channels during actual transmission is overcome and channels used during PHR calculation may be different and, more particularly, PUSCH for transmitting PHR may be dropped. In this case, PHR may be re-triggered. That is, the case in which PUSCH for transmitting PHR is dropped may be added to the PHR trigger condition.

More particularly, when the reference numerology or TTI length is configured, PHR may be transmitted with respect to a longer TTI length or smaller subcarrier spacing than the reference numerology or the reference TTI length or a processing time is long. The PHR may be calculated assuming that channels based on a longer TTI length or smaller subcarrier spacing than the reference numerology or the reference TTI length are transmitted. For example, when PHR is calculated based on 2 OS sTTI sPUSCHs, PHR calculated via 1 ms PUSCH of another cell may be transmitted together to the 2 OS sPUSCHs.

As another proposal of the present invention, when PHR is reported with respect to specific reference numerology and/or reference TTI length, PUCCH/PUSCH within reference TTI and/or reference numerology may be entirely counted and, when the PUCCH or the PUSCH are provided in plural, a rule may be defined to measure power of first one thereamong and to consider the measured power in calculation of PHR. For example, when a plurality of 1 ms PUSCHs and a plurality of 2 OS sPUSCHs overlap with each other, a rule may be defined to calculate and, then, report PHR in consideration of power of the first overlapping sPUSCH.

As another proposal of the present invention, a TTI length and/or numerology of a channel for transmitting PHR may be predetermined or configured via a high layer signal among a plurality of different TTI lengths and/or numerologies.

As another proposal of the present invention, the UE may trigger PHR transmission when a path attenuation value calculated based on specific RS power is greater than a predetermined threshold value. A rule may be defined to independently or differently configure a threshold value for the PHR triggering for each TTI length and/or for each numerology and, in this case, the threshold value may be predetermined or may be configured/indicated via a high/physical layer signal.

As another proposal of the present invention, when transmission timings of UL channels with different TTI lengths and/or numerologies overlap with each other with respect to a specific carrier or in a CA situation, a channel with low priority may be suspended or dropped. When PH of a channel with a longer TTI length and/or smaller subcarrier spacing is calculated with respect to a specific carrier, a rule may be defined to calculate and report a virtual PH value when the corresponding channel is suspended or dropped via the aforementioned collision. Here, the virtual PH value may include a PH value obtained when some of power parameters are not considered. For example, the virtual PH value may be the same or similar to the calculated PH value when the UE does not transmit PUSCH with respect to calculation of the aforementioned Type 1 PH or Type 2 PH and the power control parameter may be a bandwidth ($M_{PUSCH,c}(i)$, a bandwidth of PUSCH resource allocation represented by the number of effective resource blocks in a subslot/slot/subframe i for a serving cell c) with respect to a PUSCH resource, $P_{O\_PUSCH,c}(j)$, modulation and coding scheme (MCS) dependent parameter delta_TF ($\Delta TF,c(i)$), or the like.

As another example, even if a corresponding channel is suspended or dropped, a rule may be defined to consider a corresponding channel to be transmitted and to report a PH value calculated based on actual power. A method used to perform PHR among the above PH calculation methods may be configured/indicated via a high/physical layer signal. Alternatively, the UE may select one of the above PH calculation methods and calculate PH and may report information on a method used to perform PHR, included in PHR.

As another example, when a rule is defined to report a PH value with respect to all carriers to sPUSCH, a PH value with respect to a carrier that is not configured with sTTI may be reported as an actual PH value or a virtual PH value in consideration of suspension or drop due to scheduling or collision of 1 ms TTI PUSCH (or PUSCH with a different TTI length or numerology from the sTTI) of a corresponding carrier. In detail, a rule may be defied in such a way that, when PUSCH is scheduled (or transmitted rather than being dropped/suspended) in a subframe including UL sTTI for transmitting PHR with respect to a corresponding carrier, an actual PH value is reported and, otherwise, a virtual PH value obtained by assuming PUSCH transmission in a subframe including UL sTTI for transmitting PHR with respect to a corresponding carrier is calculated and is reported to the sPUSCH.

As another proposal of the present invention, with respect to a specific carrier or in a CA situation, when transmission timings of UL channels with different TTI lengths and/or numerologies overlap with each other, a channel with low priority may be suspended or dropped. When PH information is expected to deliver PH information in a channel (e.g., PUSCH with a longer TTI length) with low priority, if transmission timings of the channel and a channel (e.g., shorter TTI PUSCH/PUCCH) with high priority overlap with each other, the PH information may also be lost while the channel with low priority is dropped. To prevent loss in PH information, when PUSCH including PHR, which is to be transmitted, is dropped or suspended due to collision or the like, a rule may be defined to transmit MAC CE including PH information to a channel with high priority, which is transmitted rather than being dropped or suspended. For example, PH is expected to be transmitted to 1 ms PUSCH but when the 1 ms PUSCH is suspended or dropped due to collision with sTTI PUSCH (or SPUSCH), corresponding PH information may be transmitted to the sTTI PUSCH.

As another proposal of the present invention, a rule may be defined to preferentially transmit PH to PUSCH including HARQ-ACK, including DMRS, transmitted in a lower cell index, belonging to a PUCCH group with high priority (e.g., a primary PUCCH group has higher priority than a secondary PUCCH group), and/or having a shorter TTI length among PUSCHs to be scheduled or transmitted to a plurality of carriers at the same time in a CA situation. This is for minimizing loss of PHR by adding PH information to PUSCH in which last dropping or suspension occurs in the following power prioritization (in a situation in which the UE is capable of performing simultaneous transmission with respect to different TTI lengths but power is limited).

As indicated by UE capability simultaneousTx-differentTx-duration, when a UE is configured with PUCCH-SCell and a primary PUCCH group and a secondary PUCCH group are configured with high layer parameter ul-TTI-Length of different values for serving cells for a UE that is capable of simultaneously transmitting different UL signal durations to different serving cells and entire transmission power of the UE is greater than $\tilde{P}_{CMAX,c}(i)$, the UE may drop next channels in order from a highest serving cell index from a lowest serving cell index until the UE does not drop channels any longer, i.e., entire transmission power of the UE is not greater than $\tilde{P}_{CMAX,c}(i)$ or next power scaling rules may be applied until only PUSCH/PUCCH transmissions with the same duration remain:

subframe-based PUSCH without HARQ-ACK of the secondary PUCCH group
subframe-based PUSCH without HARQ-ACK of the primary PUCCH group
slot-based PUSCH without HARQ-ACK of the secondary PUCCH group
slot-based PUSCH without HARQ-ACK of the primary PUCCH group
subslot-based PUSCH without HARQ-ACK and without DMRS of the secondary PUCCH group
subslot-based PUSCH without HARQ-ACK and without DMRS of the primary PUCCH group
subslot-based PUSCH without HARQ-ACK and with DMRS of the secondary PUCCH group
subslot-based PUSCH without HARQ-ACK and with DMRS of the primary PUCCH group
subframe-based PUSCH with HARQ-ACK or subframe-based PUCCH of the secondary PUCCH group
subframe-based PUSCH with HARQ-ACK or subframe-based PUCCH of the primary PUCCH group
slot-based PUSCH with HARQ-ACK or slot-based PUCCH of the secondary PUCCH group
slot-based PUSCH with HARQ-ACK or slot-based PUCCH of the primary PUCCH group
subslot-based PUSCH with HARQ-ACK or subslot-based PUCCH of the secondary PUCCH group
subslot-based PUSCH with HARQ-ACK or subslot-based PUCCH of the primary PUCCH group The aforementioned proposed methods may be included in one of embodiments of the present invention and, thus, may be considered as a type of proposed methods. The aforementioned proposed methods may be independently embodied but may be embodied in a combination (or union) of some of the proposed methods. A rule may be defined to indicate information on whether the proposed methods are applied (or information on the rule of the proposed methods) to a UE through a predefined signal (e.g., a physical layer signal or a high layer signal).

Figure 9:
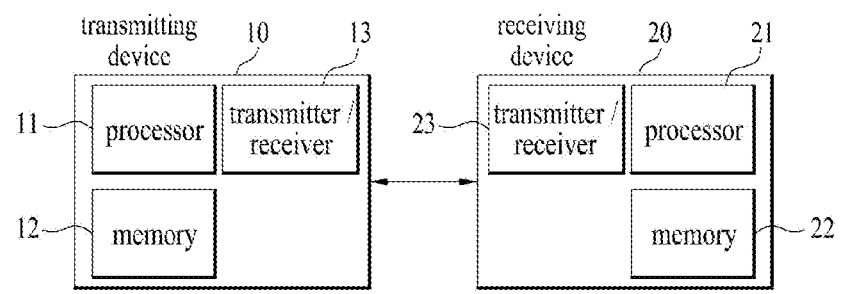
FIG. 9 is a block diagram showing an apparatus for embodying embodiment(s) of the present invention.

FIG. 9 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

As one of these embodiments, a terminal for power headroom (PH) report for the terminal for supporting a short transmission time interval (TTI) length in a wireless communication system may include a receiver and a transmitter, and a processor that controls the receiver and the transmitter and, in this case, upon triggering PH report, the processor may calculate a PH value for a first carrier or cell configured with the short TTI length configured for the terminal and a PH length for a second carrier or cell which is not configured with the short TTI length configured for the terminal and may transmit the calculated PH value through an UL channel on the first carrier or the cell, and the PH value for the second carrier or the cell may be differently calculated according to whether UL channel transmission on the second carrier or the cell is scheduled in a subframe including a time point when the PH value is reported and reported.

Additionally, when the UL channel transmission on the second carrier or the cell is scheduled, the PH value for the second carrier or the cell may be a first PH value and, when the UL channel transmission on the second carrier or the cell is not scheduled, the PH value for the second carrier or the cell may be a second PH value.

Additionally, UL channel transmission on the second carrier or the cell may be dropped or suspended when transmission timings of the UL channel transmission and the UL channel transmission on the first carrier or the cell may overlap with each other.

Additionally, the PH value for the first carrier or the cell or the PH value for the second carrier or the cell may be calculated in consideration of transmission power of a first UL channel among UL channels that overlap with each other and are scheduled to be transmitted in a reference TTI configured in each of the first carrier or the cell or the second carrier or the cell.

Additionally, the PH report may be triggered when a path attenuation value calculated based on power of a specific reference signal is greater than a threshold value and the threshold value may be determined depending on a length of the short TTI.

Additionally, the UL channel on the first carrier or the cell may be selected according to a predetermined priority rule among a plurality of serving carriers or cells configured for the UE.

Additionally, the priority rule may be configured to allocate a higher priority to a UL channel on a carrier or cell including hybrid automatic repeat request (HARD) acknowledgment/negative-acknowledgment (ACK/NACK), including a demodulation reference signal (DMRS), having a lower cell index, belonging to a cell group with a higher priority, and/or having a shorter TTI length.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

The invention claimed is:

1. A method for power headroom (PH) reporting by a user equipment (UE) in a wireless communication system supporting different transmission time interval (TTI) lengths including a first TTI length and a second TTI length, the second TTI length being shorter than the first TTI length, the method comprising:

obtaining a PH value for a first cell configured with the first TTI length, wherein the PH value for the first cell is obtained based on whether a first physical uplink shared channel (PUSCH) transmission is scheduled on the first cell, wherein the first PUSCH transmission has the first TTI length; and transmitting, to a second cell, the obtained PH value through a second PUSCH having the second TTI length, wherein obtaining the PH value for the first cell comprises:

based on the first PUSCH transmission being scheduled on the first cell and the first PUSCH transmission being dropped due to a collision with the second PUSCH, obtaining the PH value for the first cell based on at least (i) a bandwidth of the first PUSCH transmission and (ii) a modulation and coding scheme (MCS) related parameter, and based on the first PUSCH transmission not being scheduled on the first cell, obtaining the PH value for the first cell based on power control parameters other than (i) the bandwidth of the first PUSCH transmission and (ii) the MCS related parameter.

2. The method according to claim 1, wherein the first TTI length corresponds to a subframe length.

3. The method according to claim 1, wherein the PH value for the first cell is information about a difference between (i) a maximum transmission power for the first cell and (ii) a transmission power estimated for the first cell.

4. The method according to claim 1, wherein the PH value is transmitted through a medium access control (MAC) signaling.

5. The method according to claim 1, wherein the transmission of the PH value is triggered based on a pathloss value being greater than a threshold or based on a timer.

6. A user equipment (UE) configured to perform power headroom (PH) reporting in a wireless communication system supporting different transmission time interval (TTI) lengths including a first TTI length and a second TTI length, the second TTI length being shorter than the first TTI length, the UE comprising:
- a transmitter;
- at least one processor; and
- at least one computer memory operatively connected to the at least one processor and storing instructions that, when executed by the at least one processor, perform operations comprising:
  - obtaining a PH value for a first cell configured with the first TTI length, wherein the PH value for the first cell is obtained based on whether a first physical uplink shared channel (PUSCH) transmission is scheduled on the first cell, wherein the first PUSCH transmission has the first TTI length, and
  - transmitting, through the transmitter and to a second cell, the obtained PH value through a second PUSCH having the second TTI length,
  - wherein obtaining the PH value for the first cell comprises:
  - based on the first PUSCH transmission being scheduled on the first cell and the first PUSCH transmission being dropped due to a collision with the second PUSCH, obtaining the PH value for the first cell based on at least (i) a bandwidth of the first PUSCH transmission and (ii) a modulation and coding scheme (MCS) related parameter, and
  - based on the first PUSCH transmission not being scheduled on the first cell, obtaining the PH value for the first cell based on power control parameters other than (i) the bandwidth of the first PUSCH transmission and (ii) the MCS related parameter.

7. The UE according to claim 6, wherein the first TTI length corresponds to a subframe length.

8. The UE according to claim 6, wherein the PH value for the first cell is information about a difference between (i) a maximum transmission power for the first cell and (ii) a transmission power estimated for the first cell.

9. The UE according to claim 6, wherein the PH value is transmitted through a medium access control (MAC) signaling.

10. The UE according to claim 6, wherein the transmission of the PH value is triggered based on a pathloss value being greater than a threshold or based on a timer.

11. A processor for a wireless communication device supporting a different transmission time interval (TTI) lengths including a first TTI length and a second TTI length, the second TTI length being shorter than the first TTI length, wherein the processor is configured to control the wireless communication device to perform operations comprising:
- obtaining a PH value for a first cell configured with the first TTI length, wherein the PH value for the first cell is obtained based on whether a first physical uplink shared channel (PUSCH) transmission is scheduled on the first cell, wherein the first PUSCH transmission has the first TTI length; and
- transmitting, to a second cell, the obtained PH value through a second PUSCH having the second TTI length,
- wherein obtaining the PH value for the first cell comprises:
- based on the first PUSCH transmission being scheduled on the first cell and the first PUSCH transmission being dropped due to a collision with the second PUSCH, obtaining the PH value for the first cell based on at least (i) a bandwidth of the first PUSCH transmission and (ii) a modulation and coding scheme (MCS) related parameter, and
- based on the first PUSCH transmission not being scheduled on the first cell, obtaining the PH value for the first cell based on power control parameters other than (i) the bandwidth of first the PUSCH transmission and (ii) the MCS related parameter.

12. The processor according to claim 11, wherein the first TTI length corresponds to a subframe length.

13. The processor according to claim 11, wherein the PH value for the first cell is information about a difference between (i) a maximum transmission power for the first cell and (ii) a transmission power estimated for the first cell.

14. The processor according to claim 11, wherein the PH value is transmitted through a medium access control (MAC) signaling.

15. The processor according to claim 11, wherein the transmission of the PH value is triggered based on a pathloss value being greater than a threshold or based on a timer.

* * * * *